(12) United States Patent
Middelfart (10) Patent No.: US 7,779,018 B2
(45) Date of Patent: Aug. 17, 2010

(54) PRESENTATION OF DATA USING META-MORPHING

(75) Inventor: Morten Middelfart, Hjorring (DK)

(73) Assignee: Targit A/S, Hjorring (DK)

( * ) Notice: Subject to any disclaimer, the term of this patent is extended or adjusted under 35 U.S.C. 154(b) by 0 days.

(21) Appl. No.: 10/556,214

(22) PCT Filed: May 17, 2004

(86) PCT No.: PCT/DK2004/000347

§ 371 (c)(1),
(2), (4) Date: Oct. 2, 2006

(87) PCT Pub. No.: WO2004/102416

PCT Pub. Date: Nov. 25, 2004

(65) Prior Publication Data

US 2007/0174262 A1  Jul. 26, 2007

Related U.S. Application Data

(63) Continuation-in-part of application No. 10/449,811, filed on May 29, 2003.

(30) Foreign Application Priority Data

May 15, 2003  (EP) .................................. 03388037

(51) Int. Cl.
*G06F 7/00* (2006.01)
*G06F 17/30* (2006.01)
(52) U.S. Cl. ..................... 707/758; 707/759; 707/999.1

(58) Field of Classification Search ........................ None
See application file for complete search history.

(56) References Cited

U.S. PATENT DOCUMENTS

| 4,800,510 A | | 1/1989 | Vinberg et al. | |
|---|---|---|---|---|
| 5,611,034 A | | 3/1997 | Makita | |
| 5,692,181 A | * | 11/1997 | Anand et al. | ................. 707/102 |
| 5,884,302 A | | 3/1999 | Ho | |

(Continued)

FOREIGN PATENT DOCUMENTS

EP  0 961 439  12/1999

(Continued)

OTHER PUBLICATIONS

Michelle X. Zhou, et al.; Representing and Retrieving . . . Generation; Mar. 21, 2001; pp. 87-94.

(Continued)

*Primary Examiner*—Mohammad Ali
*Assistant Examiner*—Angelica Ruiz
(74) *Attorney, Agent, or Firm*—Buchanan Ingersoll & Rooney, PC (57) ABSTRACT

A computer-implemented method for presenting data is disclosed. The method includes determining items in a question that are contained in a predefined list of items and are defined to be measures or dimensions, determining an association based on the determined items and, based on the determined association, retrieving presentation properties related to a stored association, applying the determined association query the database, and retrieving data which is presented using the presentation properties. The method also includes registering a count that representing a frequency of use of the presentation properties.

19 Claims, 7 Drawing Sheets

U.S. PATENT DOCUMENTS

| | | | |
|---|---|---|---|
| 5,911,138 A | 6/1999 | Li et al. | |
| 5,940,818 A | 8/1999 | Malloy et al. | |
| 6,108,657 A * | 8/2000 | Shoup et al. | 707/100 |
| 6,160,549 A | 12/2000 | Touma et al. | |
| 6,226,647 B1 * | 5/2001 | Venkatasubramanian et al. | 707/102 |
| 6,415,298 B1 | 7/2002 | Oesterer et al. | |
| 6,418,441 B1 | 7/2002 | Call | |
| 6,490,590 B1 | 12/2002 | Fink | |
| 6,615,172 B1 * | 9/2003 | Bennett et al. | 704/257 |
| 6,625,617 B2 | 9/2003 | Yarnall et al. | |
| 6,643,635 B2 | 11/2003 | Nwabueze | |
| 6,647,363 B2 * | 11/2003 | Claassen | 704/1 |
| 6,671,689 B2 | 12/2003 | Papierniak | |
| 6,775,675 B1 | 8/2004 | Nwabueze et al. | |
| 6,816,879 B1 | 11/2004 | Kiritzov et al. | |
| 6,873,993 B2 * | 3/2005 | Charlesworth et al. | 707/102 |
| 6,889,230 B1 | 5/2005 | Rogers | |
| 7,010,523 B2 | 3/2006 | Greenfield et al. | |
| 7,051,038 B1 | 5/2006 | Yeh et al. | |
| 7,103,591 B2 | 9/2006 | Asobayire et al. | |
| 7,170,519 B2 * | 1/2007 | Patel et al. | 345/440 |
| 7,171,335 B2 | 1/2007 | Liu et al. | |
| 7,209,876 B2 | 4/2007 | Miller et al. | |
| 7,293,031 B1 * | 11/2007 | Dusker et al. | 707/101 |
| 2001/0013004 A1 | 8/2001 | Haris et al. | |
| 2002/0038230 A1 | 3/2002 | Chen | |
| 2002/0059183 A1 * | 5/2002 | Chen | 707/1 |
| 2002/0059195 A1 | 5/2002 | Cras et al. | |
| 2002/0062290 A1 | 5/2002 | Ricci | |
| 2002/0070953 A1 | 6/2002 | Barg et al. | |
| 2002/0087516 A1 | 7/2002 | Cras et al. | |
| 2002/0091681 A1 * | 7/2002 | Cras et al. | 707/3 |
| 2002/0129004 A1 * | 9/2002 | Bassett et al. | 707/1 |
| 2002/0156714 A1 | 10/2002 | Gatto | |
| 2002/0184024 A1 * | 12/2002 | Rorex | 704/255 |
| 2003/0009295 A1 | 1/2003 | Markowitz et al. | |
| 2003/0050825 A1 | 3/2003 | Gallivan et al. | |
| 2003/0061096 A1 | 3/2003 | Gallivan et al. | |
| 2003/0061358 A1 | 3/2003 | Piazza et al. | |
| 2003/0071814 A1 | 4/2003 | Jou et al. | |
| 2003/0088564 A1 * | 5/2003 | Lohmann et al. | 707/6 |
| 2003/0101119 A1 | 5/2003 | Parsons et al. | |
| 2003/0120593 A1 | 6/2003 | Bansal et al. | |
| 2003/0126136 A1 | 7/2003 | Omoigui | |
| 2003/0158795 A1 * | 8/2003 | Markham et al. | 705/28 |
| 2003/0193502 A1 * | 10/2003 | Patel et al. | 345/440 |
| 2004/0039707 A9 | 2/2004 | Ricci | |
| 2004/0059705 A1 | 3/2004 | Wittke et al. | |
| 2004/0193576 A1 * | 9/2004 | Petculescu et al. | 707/3 |
| 2004/0230585 A1 | 11/2004 | Middelfart | |
| 2005/0076045 A1 * | 4/2005 | Stenslet et al. | 707/101 |
| 2005/0192931 A1 | 9/2005 | Rogers | |
| 2005/0198042 A1 * | 9/2005 | Davis | 707/10 |
| 2005/0210389 A1 | 9/2005 | Middelfart | |
| 2005/0223093 A1 | 10/2005 | Hanson et al. | |
| 2006/0106843 A1 | 5/2006 | Middelfart et al. | |
| 2006/0149407 A1 * | 7/2006 | Markham et al. | 700/108 |
| 2008/0016035 A1 | 1/2008 | Middelfart | |
| 2008/0301539 A1 | 12/2008 | Middelfart et al. | |
| 2009/0187845 A1 | 7/2009 | Middelfart | |

FOREIGN PATENT DOCUMENTS

| | | |
|---|---|---|
| EP | 1 081 610 A2 | 3/2001 |
| EP | 1 081 611 A2 | 3/2001 |
| EP | 1 477 909 A1 | 11/2004 |
| EP | 1 574 969 A1 | 9/2005 |
| EP | 1 577 808 A1 | 9/2005 |
| EP | 1 659 503 A1 | 5/2006 |
| WO | 82/00726 | 3/1982 |
| WO | WO 97/08604 A2 | 3/1997 |
| WO | WO 01/09780 A1 | 2/2001 |
| WO | WO 01/35256 A2 | 5/2001 |
| WO | WO 01/82135 A1 | 11/2001 |
| WO | WO 2004/102416 A2 | 11/2004 |

OTHER PUBLICATIONS

N. Aloia, et al.; Design of Multimedia Semantic Presentation . . . of Use; May 24, 1998; pp. 205-215.

MacKinlay J; Automating the Design of Graphical . . . Information; vol. 5; No. 2; Apr. 1986; pp. 110-141.

Notice of Allowance dated Sep. 8, 2009 from related U.S. Appl. No. 10/802,509.

Notice of Allowance dated Sep. 8, 2009 from related U.S. Appl. No. 10/991,302.

Abualsamid, Ahmad. "PHP & Hosted Applications: A flexible scripting language for building dynamic web pages", *Dr. Dobb's Journal* (2001), 26(1): 56, 58, 60-63.

Spiers, Andrew, "Creating Dynamic WBMP images using PH?", WMLScript.com, (Jan. 13, 2001) pp. 1-3.

Royappa, Andrew V. "The PHP Web Application Server" *Journal of Computing in Small Colleges* (2000), 15(3): 201-211.

"L" interface avec une base de données, Université Paris, (Oct. 18, 2000), pp. 1-4, Retrieved from http://web.archive.org/web/20001018225046.

*Internet Archive Wayback Machine* Search Results for "http://margotte.univ._Paris_ 1.fr/webcurse/html sql.html", Oct. 18, 2000. Retrieved from http://web.archive.org/web.

"Les bases de données relationnelles, Chapitre 25: les échanges de données," (Jan. 3, 2003), pp. 1-6. Retrieved from http://cerig.efpg.inpg.fr/tutoriel/bases-de-donness/chap25.htm.

"Importer Et Exporter Avec Excel, Source No. 3673," *Visual Basic Code Sources*, (Jun. 19, 2002) pp. 1-2. Retrieved from http://www.vbfrance.com/code.aspx?ID = 3673.

Perez, J. M. et al. "A Relevance-Extended Multi-Dimensional Model for a Data Warehouse Contextualized with Documents" DOLAP (2005) p. 19-28.

Form PCT/ISA/210 (International Search Report) dated Dec. 5, 2007, issued in corresponding International Application PCT/DK2007/000232.

Form PCT/ISA/237 (Written Opinion of the International Searching Authority) dated Dec. 5, 2007 issued in corresponding International Application PCT/DK2007/000232.

B. Azvine et al., "Intelligent Process Analytics for CRM", Bt Technology Journal, Jan. 2006, vol. 24, No. 1, pp. 60-69, XP-019392378, Kluwer Academic Publishers.

Pawan Chowdhary et al., "Enterprise Integration and Monitoring Solution Using Active Shared Space", Proceedings of the 2005 IEEE International Conference on e-Business Engineering (ICEBE'05), Oct. 12, 2005, pp. 665-672, XP-010860530, The Compute Society.

Russell Barr et al., "Real Time Modeling for Financial and Performance Management", Cement Industry Technical Conference, IEEE, May 15-20, 2005, pp. 43-51, XP-010840065.

Office Action dated Mar. 20, 2007 from related U.S. Appl No. 10/302,509.

Office Action dated Jul. 18, 2006 from related U.S. Appl. No. 10/802,509.

Office Action dated Dec. 11, 2007 from related U.S. Appl. No. 10/802,509.

Office Action dated Dec. 15, 2008 from related U.S. Appl. No. 10/802,509.

Office Action dated Jun. 15, 2009 from related U.S. Appl. No. 11/509832.

Office Action dated Sep. 19, 2008 from related U.S. Appl. No. 11/509,832.

Office Action dated Feb. 5, 2008 from related U.S. Appl. No. 10/991,302.

Office Action dated Jun. 22, 2007 from related U.S. Appl. 10/991,302.

Office Action dated Jun. 22, 2009 from related U.S. Appl. No. 10/991,302.

Office Action dated Oct. 2, 2008 from related U.S. Appl. No. 10/991,302.
Office Action dated Mar. 20, 2007 from related U.S. Appl. No. 10/449,811.
Office Action dated May 4, 2009 from related U.S. Appl. No. 10/449,811.
Office Action dated Jul. 18, 2006 from related U.S. Appl. No. 10/449,811.
Office Action dated Sep. 15, 2008 from related U.S. Appl. No. 10/449,811.
Office Action dated Nov. 10, 2005 from related U.S. Appl. No. 10/449,811.
Office Action mailed Dec. 18, 2007 from related U.S. Appl. No. 10/449,811.
EP Search Report dated Dec. 18, 2008 from EP Application No. 07 38 8055 corresponding to U.S. Appl. No. 11/509,832.
Becks, A., "Sewasie - Specification of the Interface Design" XP002300607, Retrieved from the Internet: URL: http://www.sewasie.org/documents/D-4-4-interface-design.pdf> [retrieved on Oct. 13, 2004].
W. Cody et al., "The Integration of Business Intelligence and Knowledge Management" XP002300608, Retrieved from the Internet: URL: http://www.research.ibm.com/journal/sj/414/cody.pdf> [retrieved on Oct. 13,2004].
Becks, a., "Sewasie - Specification of the Architecture of the Monitoring Agent/Visualization Component" XP002300606, Retrieved from the Internet: Url: http://www.sewasie.org/documents/D-4-1-monitoring-agentarchitecture.pdf> [retrieved on Oct. 13, 2004].
Communication from European Patent Office dated Jul. 28, 2004 from related EP Application No. 04388019.
Johnson et al., History data facility in the SLC control system, May 6-9, 1991, IEEE, vol. 3, 1540-1542.
Priebe et al., Ontology-based integration of OLAP and information retrieval, Sep. 1-5, 2003, IEEE, 610-614.
Office Action dated Dec. 8, 2009 from U.S. Appl. No. 11/509,832.
Communication dated Mar. 6, 2009 from related EP Application No. 04 388 077.2 corresponding to U.S. Appl. No. 10/991,302.
Communication dated Sep. 2, 2008 from EP Application No. 08 15 5432.1 corresponding to U.S. Appl. No. 12/112,178.
"MicroStrategy Introduces Next-Generation Dynamic Enterprise Dashboards" Thomasnet Industrial Newsroom, [Online] Jan. 22, 2007, XP002491679 Retrieved from the Internet: URL:Http://news.thomasnet.com/fullstory/802157>[retrieved on Feb. 25, 2010].
Technologies4targeting Ltd.: "Cognos Visualizer - Corporate dashboards that give managers insight to make better decisions" Internet Article, [Online] 2004, XP002491680 Retrieved from the Internet: URL:http://www.tech4t.co.uk/pages/cognos_visualizer.html> [retrieved on Feb. 25,2010].
Chaudhuri S et al: "An Overview of Data Warehousing and OLAP Technology" SIGMOD Record, ACM, New York, NY, US, vol. 26, No. 1, Mar. 1, 1997, pp. 65-74, XP002193792 ISSN: 0163-5808.
Microstrategy Incorporated: "MicroStrategy 8 Frequently Asked Questions (FAQ)" Internet Article, [Online] 2005, XP002491681 Retrieved from the Internet: URL:http://www.firstbi.com.tw/download/8.0%20FAQ.pdf> [retrieved on Feb. 25, 2010].
Communication dated Aug. 10, 2007 from EP Application No. 04 388 077.2 corresponding to U.S. Appl. No. 10/991,302.
Communication dated Oct. 29, 2009 from EP Application No. 04 388 077.2 corresponding to U.S. Appl. No. 10/991,302.

* cited by examiner

PRESENTATION OF DATA USING META-MORPHING

This application is a continuation-in-part of copending application Ser. No. 10/449,811 filed May 29, 2003, claims the benefit thereof and incorporates the same by reference.

This invention relates to a computer-implemented method of making a presentation of data using meta-morphing. A presentation is made based on user preferences.

BACKGROUND

Data processing for analytical or monitoring/reporting purposes ranging from simple accounting or storage of collected sample values to complex calculations or advanced queries to complex data structures generates results which are presented graphically/visually to a user. Thereby the user is able to interpret the results and make decisions based on them. This may be irrespective of whether they are presented in textual form or in a graph form.

The graphical/visual presentation of data is greatly influenced by the type of graphical/visual means applied to make the presentation and layout properties of the graphical/visual means. For textual presentations the means may comprise text sections, headings, tables with columns and rows, etc. The layout properties may comprise font size, line spacing, etc. For graphical presentations the means may comprise different types of charts and diagrams such as bar charts, line charts, pie charts, scatter charts, radar diagrams and other known diagrams or charts based on graphical elements. The layout properties may comprise tick marker spacing on an axis, legend font size, etc.

Typically, the presentation means are selected by a user from a so-called 'report generator' or a 'chart wizard', wherefrom default layout properties or user specified layout properties are selected before making the presentation.

Presentation means may be more or less suitable for making a presentation of a specific result with given contents, structure and format. Typically, the user is the only one to make a decision on that since it may require knowledge of the result, which is not present in the application wherein the presentation is made. However, the layout properties for specific presentation means are to some extent determined by properties of the physical medium on which the presentation is to be made. These properties are typically known to the application since knowledge of these properties is required to make the presentation. Therefore, the application can to some extent provide automatic setting of the layout properties. However, when it comes to layout properties which clearly are to be set in response to preferences of individual users and which may depend heavily of the content, structure and format of the result, it becomes critical to select a presentation automatically or semi-automatically.

Selecting either automatically or manually presentation properties may consequently degrade the quality of the presentation.

In some types of applications the result has a fixed structure and format which is presented by the same graphical/visual means. Thereby, it may be worth the effort to select the presentation means that gives the best interpretation of the result and select the layout properties that provide the best presentation quality.

However, in other types of applications the results may take different structures and formats which are presented by different graphical/visual means. Thereby, it may be an overwhelming task to select all possible combinations of presentation means and layout properties to be able to capture all different structures and formats which may be subject to a presentation.

Especially, in connection with presentation of results obtained by submitting a query to a database, the query to the database may generate results that can take so many different structures and formats that it may be practically impossible to capture all the combinations of a result for making an automatic or semi-automatic presentation.

The ever increasing data capacity of storage memories and the widespread use of databases increases the amount of time a user is confronted with the task of, on the one hand, making queries to databases; and on the other hand, selecting a presentation for the data retrieved by the query. Actually, data can be retrieved by natural language questions which can be submitted from a user interface and which are subsequently converted to queries that can be interpreted by a database. By using a natural language to subsequently form a query, a user is relieved from the, in this respect, tedious task of making a query requiring exact knowledge of both the structure of the database and the syntax of the query language.

Data processing techniques for analytical purposes are, contrary to data processing for transaction purposes, optimized with respect to providing a user with processors and presentation tools that can generate illustrations of the result of a specified analysis task.

Not only the data processing techniques, but also the data on which the analysis is to be based are often arranged with the special aim of supporting analysis purposes. This means that data are organised in a straight forward or flat organisation. This straight forward organisation of the data requires, however, a higher memory consumption and longer access time to the data when compared to organisation of data for transaction purposes. Typically, databases for analytical purposes comprise redundant data in that pre-computed aggregations of data are comprised in the database along with underlying data, ie data across which the aggregation(s) is/are performed. Thus, one can say that such a database represents data at different levels of granularity.

A well-recognised organisation of data for analysis purposes comprises multidimensional databases e.g. so-called cube databases, or simply Cubes, for OLAP, OnLine Analytical Processing, databases. However, various types of databases and other types of data structures can be used for analytical processing, including relational databases, flat file databases, XML (Extensible Markup Language) databases, etc. In these databases elements of data can be denoted data items and can be defined as a field in a specific record, a cell in a table or spreadsheet, or a delimiter or tag separated or fixed-length data entity.

Despite their different structures each of the data items in the databases can be categorized as being so-called measures or dimensions. From a data representation point of view there are prima facia no differences, but from a user's point of view, a data item of the measures type can be interpreted as a measure value given a specific condition specified by an associated value of a data item of the dimensions type. A value of a data item of the dimensions type is also recognised as a so-called dimension value or a criterion.

Hence, for instance a range of data items categorized as measures can represent sales figures in an organisation. These sales figures are given a meaning when associated with the specific conditions of the time instances at which the sales figures represent the sales in the organisation. The time instances are represented by means of the dimension values. By categorizing the data items in this way an additional and more abstract way of representing data is provided; this additional representation is also denoted meta-data. In the above example, time is thus a dimension and the sales figures are categorized as a measure.

The data processing techniques for analytical purposes operate on these data whatever the organisation of the data to provide a result of the analysis. For this purpose, an analysis task can be specified by a request to a database. The result of the analysis is then illustrated by means of a data report. The data report can be set up by a user who selects presentation objects and properties thereof by of a so-called 'report generator' or a 'chart wizard', wherefrom default layout properties or user-specified layout properties are selected before making the presentation.

In connection therewith it is a well-known situation that a user often uses some sort of trial-and-error for tuning, on the one hand, the specification of the analysis task and, on the other hand, the illustration of the result of the analysis. Therefore, a further specification of the analysis task and the illustration of the results are functions which more or less have merged into the same user interface for more or less simultaneous tuning of an analysis and the results thereof.

PRIOR ART

In the prior art several techniques for making presentations of data are disclosed.

U.S. Pat. No. 5,611,034 discloses a method of making a graph by selecting one of a plurality of graph forms that are automatically determined to fit a user's data format. Thereby graph forms that are deduced to be inappropriate for displaying selected data can be filtered out to make a list of appropriate graphs. For instance the method can filter out a pie chart if a user's data format involves several rows and columns. However, this method is only involved with deductions that are based on low level, logic deductions.

WO 82/00726 discloses a mechanism for generating graphic charts based on a user interface wherefrom a user can create new charts or recall previously created charts. The mechanism involves a selector mechanism which co-operates with the user interface to provide a set of interdependent and sequential menus which in combination provides guidance for the user in the process of composing a chart. The chart is created in a user selected input mode from user selected chart objects and descriptors of the chart objects. Hence, the user is provided with a wizard-like guidance wherefrom also previously created charts may be selected and recalled. The user however, has to remember which chart to select and recall.

U.S. Pat. No. 6,160,549 discloses a report generator that uses a graphical user interface to facilitate specification of layout aspects of the report and data aspects of the report. The report generator allows the use of multiple database queries that are related to each other in a parent-child relationship in a tree hierarchy. Each node of the tree describes a layout object with layout properties and introduces a relation between the report layout and data. The layout properties are defined by a user by means of a graphical user interface. Thereby the task of procedural or declarative report programming is limited or avoided in report development. Despite being able to reuse previously specified presentation elements combined with a previously used query element when the query element is used again, it may be desired to alter the presentation element when used in a new query/presentation context. Thereby reuse of presentation element as in the original context is spoiled.

U.S. Pat. No. 4,800,510 discloses a method for controlling the process of designing the layout of a computer-generated graph by automatical adjustment of design parameters that determines the layout of the graph in response to user selected parameters that are selected at a higher level of abstraction of the computer-generated graph. This is carried into effect by referencing each group of multiple design parameters by a single user selectable parameter.

As shown above, the prior art discloses various techniques for easing the task of setting up the layout of a presentation in the form of a graphical report or a graph. At a relatively high abstraction level the user is involved in selecting the presentation, whereas at lower abstraction levels, involving more details, a system automatically generates the presentation. The automatically generated presentation is generated from previously stored preferences on previous presentations or knowledge of the data or the queries that are used for retrieving the data to be presented.

The article "Design of multimedia semantic presentation templates: options, problems and criteria of use" in PROCEEDINGS OF THE WORKING CONFERENCE ON ADVANCED VISUAL INTERFACES, ACM PRESS, 24-27 May 1998, pages 205-215 discloses a set of multimedia presentation templates along with a set of criteria, which can be used to drive their application. Presentations are based on an initial analysis of the data selected by a query, the data types of the database attributes involved, and the set of multimedia presentation templates along with a set of criteria. Data aggregations which each represents an equivalence class of presentations are obtained by associating each of composition operators with a corresponding set of presentation templates. Thereby an automatic generation of a multimedia presentation from query result is provided.

Application of the disclosed multimedia presentation templates require, however, a complete mapping between the templates and the database attributes. This mapping can be complex and cumbersome, especially if a large number of attributes and templates exist or if further data attributes or presentation templates are added to an existing design. Since the presentation templates are mapped to the data attributes, the data attributes and the query result must be precisely, completely and unambiguously defined in the query. This may work well for users that have a through knowledge of the specific database and database query design. But for the broader group of users the disclosed application of presentation templates will lead to dissatisfied users in that they probably do not have the skills to prepare a presentation at all. The disclosed application is thus only a way of handling constraints between data and possible presentations.

Despite being involved with the queries that generate data to be presented, the prior art is not involved with retrieving previously stored presentation properties, in the sense of generating a presentation, at a sufficiently high level of aid to the user requesting a presentation.

More specifically, the prior art is not concerned with metamorphing in which queries can be formulated on a very high level of abstraction and, additionally, on a lower level of abstraction.

SUMMARY OF THE INVENTION

The present invention overcomes this and other problems by means of a computer-implemented method of making a presentation of data that are retrieved by submitting a query to a database in which data items are categorized as being of a measures or a dimensions type; the method comprises the following steps: from a question received by a user interface, determining those items in the question that are contained in a predefined list of items that are available in the database and are defined to be of the measures type or the dimensions type;

based on the determined items, determining an association, which comprises a data item of the measures type and a data item of the dimensions type, which data items are comprised in the predefined list of data items; based on the determined association and previously stored associations, which previously stored associations are each related to presentation properties, retrieving the presentation properties of the association, among the stored associations, which is most similar to the determined association; and applying the association to make a query to the database to retrieve data which are presented by means of the presentation properties.

Thereby, meta-data can be used making deductions about which presentation to select when using an automatic selection procedure. The question can be a natural language question in which a named data item of the measures type is associated with a named data item of the dimensions type. The association can be stated by use of a reserved word such as the word 'by' or by use of another more or less simple syntax. Hence, a question could be "I would like to see sales by country". Knowing that 'sales' is a data item of the measures type and that 'country' is of the dimensions type parsing the question for associations of dimensions and measures associated by the word 'by' results in an association being determined. In case the question was: "I would like to see sales" no association would be found in the question, but an association involving the found data item of the measures type and any one of the known dimensions could be created. Based on either the found association or the created association a storage memory of presentation properties for previously used presentations can be searched and if a match is found, these presentation properties can be applied to make a presentation of data specified by the association.

Consequently, meta-knowledge of data items in questions is used for determining presentation properties. Thereby the chance of being able to retrieve presentation properties is greatly increased. Since presentation properties are searched for per association, it is possible to define presentation properties for each new combination of data items or to define several sets of presentation properties per association. Thereby the presentation of e.g. a data item 'sales' may be different depending on the association it is bound to.

Contrary to a query to a database, a natural language question is not to the same degree bound to a formal syntax. As stated in one of the above paragraphs, items in query e.g. data items and operators must typically be completely and unambiguously defined in the query. However, most and even completely unskilled users are able to ask questions. Thus, preferably the step of determining items in the question comprises the steps of: parsing the question to identify fractions of the question; comparing identified fractions to items comprised in the predefined list of items; and selecting an item being determined as matching the fraction as a determined item. Thereby, items in questions can be identified despite the question is formulated vaguely. Since, according to the invention, an association of a measure and a dimension is always either identified or created and since such an association specifies a set of data, the set of data can always be retrieved even from a vaguely or syntactical loosely formulated question. As an example, consider the question "I do not understand my customers in year 2000". This question is not suitable for querying a database, but according to invention this question can be converted automatically to a formal query. The individual words of the question can be identified as fractions of the question. If the predefined list of items comprises among others: 'customers' and 'year' and '2000' the corresponding words in the question will lead to the items being determined as matching the determined item. To this end, 'customers' can be identified as a dimension, and '2000' (optionally in connection with 'year') can be identified as a dimension value which is more generally known as a criterion. In the question considered, the question is lacking an item of measures type. Thus an association must according to the invention be created e.g. by looking up previously used associations comprising the identified dimension.

Based on the association with a measure and a dimension and optionally a dimension value, a query conforming to a query syntax of a database providing the data asked for can be composed. The step of composing the formal query is within the capabilities of a person skilled in the art. If for instance a user has asked for a presentation of a specific measure and a specific dimension, generation of the query comprises looking up a table of previously used presentations to establish the level of the dimension at which to retrieve the measure.

In recent time speech recognition has developed to an advanced stage, but the task of receiving an arbitrary spoken word from an arbitrary person, recognizing the word and providing the word in computer-readable form is a task which still does not provide unambiguous results. Therefore speech recognition has not been successfully used for querying databases in a form where the query has a free form. However, in a preferred embodiment, the invention comprises a step of receiving a spoken question, which is processed by a step of performing speech recognition to provide items in the question in computer-readable form. Hereby, the identification of items in the question and determination of an association according to the invention provides steps of speech recognition which efficiently improves the performance of the speech recognition for the purpose of receiving a question and converting it to a query. More specifically, the sample space of words recognized by the speech recognition is narrowed down to words or data items in a predefined list.

Preferably, the invention comprises a step of searching a first storage to detect a previously used association, if any, involving the determined data items, and in the event no previously used association involving the determined data items are found, creating an association involving the determined data item. Thereby a complete association can be created from an incomplete association.

In a preferred embodiment, the method comprises the steps of examining the question to detect combinations of associations; determining presentation properties by searching stored combinations of associations with assigned presentation properties; and applying the presentation properties to make a presentation of data specified by the combinations of associations.

Accordingly, presentation properties that are specific for combinations of multiple associations can be stored and applied. This is expedient when a presentation involves multiple graphical presentation means e.g. a pie chart and a bar graph or a pie chart and a table of figures.

Preferably, the method comprises the step of determining whether a data item of the dimensions type or measures types is present in the question, and in the affirmative event selecting a data item of the measures type or the dimensions types, respectively, to create an association. Thereby a user can ask very brief questions while still being provided with a useful presentation.

Preferably the method comprises the step of selecting a data item of the measures type or dimensions type involves selecting from a storage memory the data items that can be associated with the determined data item in the question to create an association. Consequently, a data item of the first type can be associated with all data items of the second type to subsequently allow a user to deselect undesired presentations.

In a preferred embodiment the method comprises the step of selecting a data item of the measures type or dimensions type involves selecting the data items that are determined to be the most frequently used data items of the dimensions type or measures type, respectively. Thereby, a user making presentations of different data items of the type measures most frequently associated with a dimension of 'time' can simply ask a question stating the measure, and according to the method, a presentation of the stated measure can be made, based on existing preferences for a like association, if any.

In a preferred embodiment the method the step of selecting a data item of the measures type involves selecting from a storage memory the data items that are determined to be the most frequently used data items in association with the determined data item in the question. Thereby, the frequency of use in this specific association only counts when selecting a data item of the measures type.

Preferably, the determined associations of data items that are applied with the presentation properties to make a presentation are registered with a count that represents a frequency of use. Thereby, only presentations that are actually made will be assigned counts in the frequency of use. Preferably, the user interface is supplied with controls to change or modify a current presentation. Any such change or modification that results in changed presentation properties will give rise to an event of reassigning the presentation properties to the most recent presentation properties. Thereby, the user's most recent preferences are stored.

In an expedient embodiment, the method comprises creation of a memory object for each determined data item of the dimensions type. Consequently, data and presentation properties for a given graphical presentation means can be handled efficiently.

Preferably, the step of retrieving the presentation properties comprises the steps of: searching a first storage for presentation properties of a previously stored, like association, and in the event presentation properties of a previously stored, like association is found, applying the presentation properties to make a presentation of the data specified by the association.

Since it may be difficult to find a complete match when searching previously used presentations, the determination of presentation properties may comprise a layered search for presentation properties. Thereby, a complete match can be favoured while ensuring that presentation properties are always provided.

Preferably, the layered search comprises a first level with a search for a match of measures and same dimensions.

Additionally, it may be appropriate that the layered search comprises a second level with a search for a match of measures and different dimensions. Thereby, the measure is taken as a cardinal selection.

Additionally, it may be convenient that the layered search comprises a third level with a search for a match of dimension at primarily the same level of dimension or secondarily at a different level of dimension.

Additionally, it may be convenient that the method comprises the step of applying an expert system, arranged to determine and apply presentation properties, in the event no like association is found.

Moreover, the invention relates to a user interface, a computer readable medium and a computer program product.

Generally, it should be noted that presentation properties can comprise all types of properties for a presentation. However, in the below presentation objects are considered a term which may be comprised by the presentation properties to handle groups of presentation properties by means of objects. Properties of such objects are denoted object properties and may also be comprised by the broad term presentation properties. Presentation objects can be considered as closely related to a graphical presentation. Thus for instance, an object can be of the type 'pie chart' or 'table' or 'bar chart' etc. However, presentation objects can also be defined in other ways without departing from the invention.

BRIEF DESCRIPTION OF THE DRAWING

A preferred embodiment of the invention will described in connection with the drawing in which.

DETAILED DESCRIPTION OF A PREFERRED EMBODIMENT

Generally and in connection with the present invention, it should be noted that a dimension is a collection of data of the same type; it allows one to structure a multidimensional database. A multidimensional database is typically defined as a database with at least three independent dimensions.

Measures are data structured by dimensions. In a measure, each cell of data is associated with one single position in a dimension.

The term OLAP designates a category of applications and technologies that allow the collection, storage, manipulation and reproduction of multidimensional data, with the goal of analysis.

Special modules may be provided to transform operational data from a source database or transaction database to analytical data in a data warehouse. In some situations it may be inconvenient to transform the operational data to analytical data which are stored in another database.

Therefore the operational database, which is typically a relational database, can be emulated such that it is exposes an interface from which the operational database appears and is accessible as a multidimensional database.

In the below, the term database can designate any type of database whether analytical or transactional, but it should be clear that analytical databases are preferred in connection with the present invention.

Figure 1:
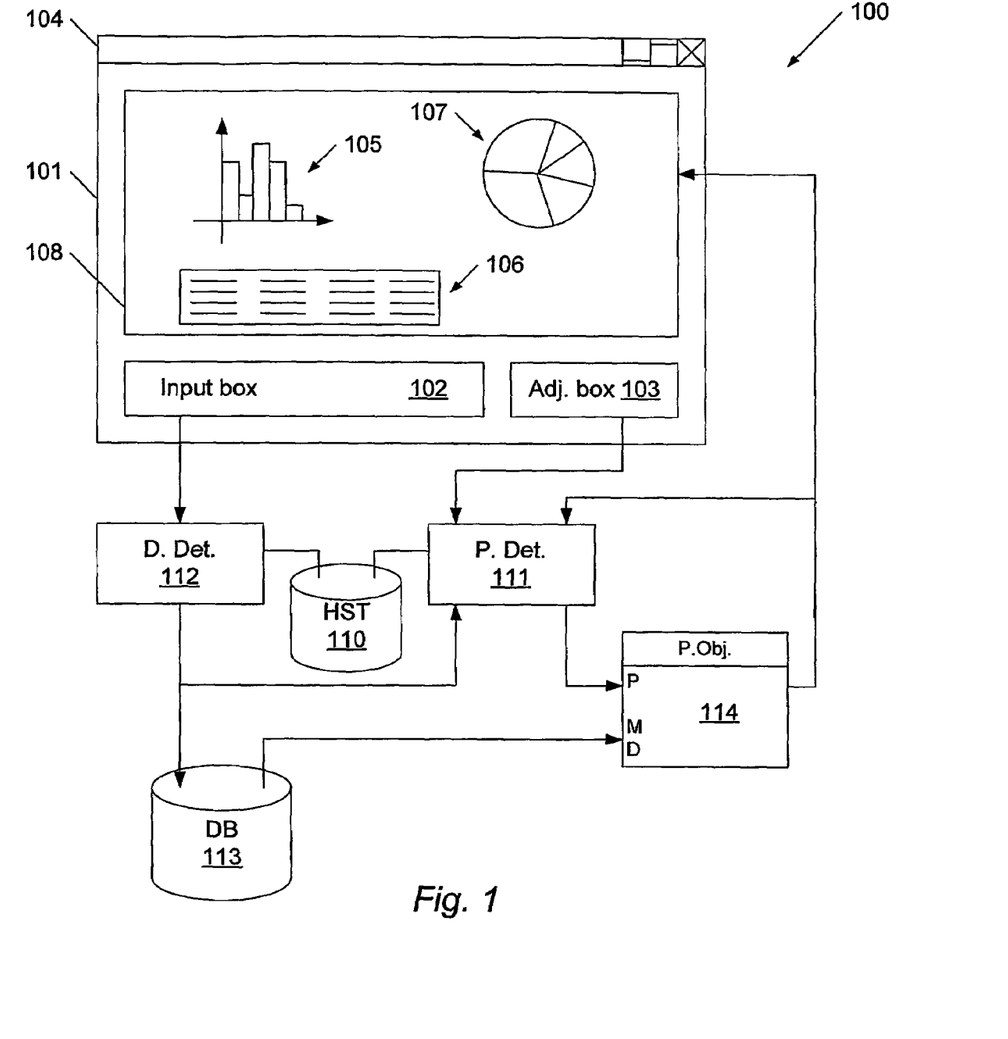
FIG. 1 shows a first block diagram of a system according to the invention.

FIG. 1 shows a first block diagram of a system according to the invention. The system 100 comprises a user interface 101 which operates in combination with a data determination component 112, a database 113, a presentation determination component 111, a storage memory 110, and a presentation memory object 114.

The user interface 101 is shown in the form of a window which has a control bar 104 with controls for closing, minimizing the size of the window and either maximizing the size or restoring the size of the window. The window comprises controls in the form of an input text box 102, an adjustment box 103, and a container 108 in which different graphical presentation objects (105,106,107) can be placed. Different presentation objects can be placed in the container, e.g. a bar chart object 105, a pie chart object 107, and a list object 106.

By means of the input box 102 a user can write a question in a natural language in his preferred language e.g. the English language. Alternatively, the input box 102 can designate a means for receiving and recognizing a spoken question; for instance by means of a microphone and voice recognition means. From a user's perspective this question constitutes a query to the database 113. In an exemplary embodiment the database can contain the following data items, wherein the date items are categorized as measures and dimensions and wherein a dimension exists at different levels such as day, month, and year:

| Measures: | Dimensions: |
|---|---|
| 'turnover' | 'time' (level 0: Year; level 1: Month; level 2: Day) |
| 'cost' | 'Customer' (level 0: Group; level 1: Name) |
|  | 'Product' (level 0: group; level 1: Name) |
|  | 'Country' |

Thereby the following questions can be asked:
1) I would like to see 'cost' grouped by 'time, month'
2) I would like to see 'turnover' grouped by 'time, month', 'customer, group' and 'product, name'
3) I would like to see 'turnover'
4) I would like to see 'country'

A question like the above ones are forwarded to a data determination unit 112, which is arranged to identify data items and their category and levels by parsing the question.

In the second situation, wherein a user can request further data by an action directed directly to a figure or element of the data report, metadata applicable to the data item of the figure or element can be retrieved or deduced. In that situation, the data determination unit 112 is arranged to identify such metadata items.

Based on the identified data items, the data determination unit 112 is able to look up a storage memory 110 of previously used combinations of meta-data and presentation properties. The contents of the storage memory 110 can have the following form as shown in table 1:

TABLE 1

| Data | Presentation | Frequency |
|---|---|---|
| Time, Level 1 Turnover | type = Barchart; legend = off; labels = off; 3D-effects = Orthogonal | 3 |
| Country; Contribution Margin | type = map; legend = off; labels = on; 3D-effects = None | 3 |
| Customer, Level 0; Turnover; Cost; Contribution Margin | Type = Crosstab; legend = off; labels = off; 3D-effects = None | 2 |
| ... | ... | ... |

Typically, a level will be named more intuitively e.g. 'time, level 1' could be 'time, per year' etc.

By searching the storage memory 110, with contents as shown in table 1 above, for a match on the data items and levels identified from the question, it is possible to determine whether a previous presentation matching the question has been used. Thereby preferred presentation properties can be found. If for instance it is determined that a question involves the data item 'time, level 1' and 'turnover', it can be deduced that the preferred presentation of these data items is a bar chart with properties as shown in table 1 above. According to the invention a more detailed description of this deduction will be described in connection with the flowcharts.

Presentation properties are determined by the presentation determining unit 111 based on the result of the search for matching data items and levels. The determined presentation properties are sent to a presentation memory object 114.

The data determining unit 112 converts the question to a query that can be submitted to a database 113 via a database connection. In response to the query, the database provides a result data set. This result data set is sent to a presentation memory object 114. Thereby the result data set and the presentation properties are handled in the same memory object 114.

Via the presentation determining unit 111, the presentation properties from the data object or from the adjustment box 103 can be used for updating the frequency count and/or another update of the storage with the registered combinations of data and presentation properties in storage memory 110.

The frequency count and/or another update of the storage can be updated in response to a user changing focus from the container 108 to the input box 102 and/or closing or minimizing the window 104. Alternatively, a button or other control (not shown) on the user interface 101 can be used as an acceptance of storing the presentation properties of the present presentation and/or update the frequency count. In the latter case, a more user committed update is provided.

Presence of controls and/or parameters in the adjustment box 103 can be regulated by registering a frequency of use for the individual controls.

Thereby, e.g. the top 4 or 5 most used controls can be adapted to be directly available in a primary box, whereas access to additional less frequently used controls is provided in a secondary box.

In a preferred embodiment, the frequency of use for controls and/or parameters in the adjustment box 103 can be regulated by registering a frequency of use for the individual controls, which frequency of use is specific to the question or data items provided via the input box 102. Thereby, the controls available in a primary box are adapted to correspond both to the data on which the presentation is based and to a user's preferences.

Figure 2:
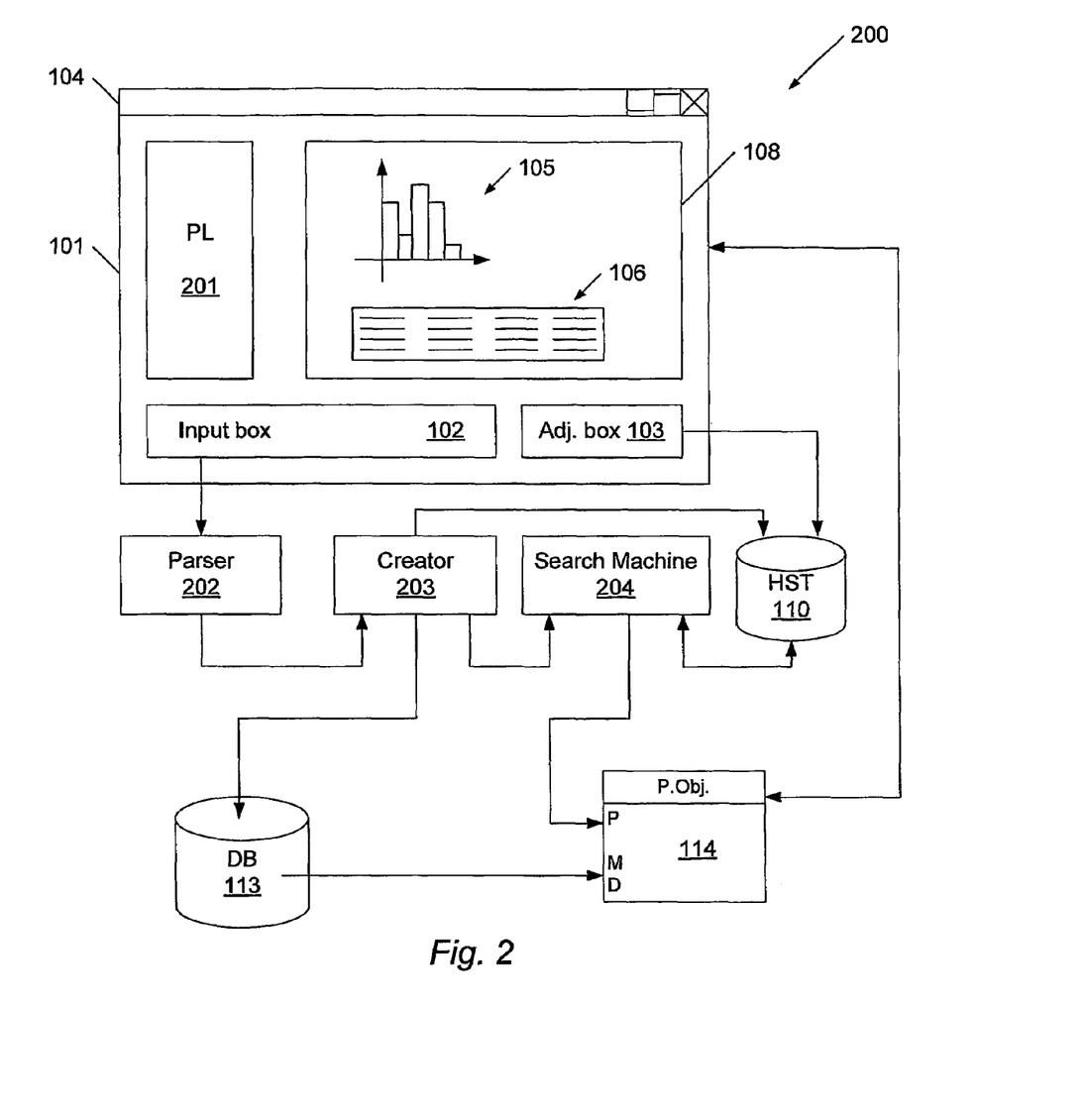
FIG. 2 shows a second block diagram of a system according to the invention.

FIG. 2 shows a second block diagram of a system according to the invention. The system 200 comprises the user interface 101 which operates in combination with a parser 202, the database 113, a creator 203, a search engine 204, the storage memory 110, and the presentation memory object 114.

The creator 202 is arranged to parse an input i.e. a question or query received by means of the input box 102 to identify data items, associations of data items and dimension levels and criteria, if any. Based on the identified items, a creator 203 initiates several operations: sending a query to the database 113; creating an association of data items which association is forwarded to storage memory 110 for immediate or subsequent storage; and forwarding the association to a search engine that searches the storage memory 110 for previously stored like associations. By means of an adjustment box 103 on the user interface 101, presentation properties of a performed presentation is registered and stored in the storage memory 110 with a relation to the association that was used for retrieving the presented data i.e. the one forwarded to the storage memory.

In the shown embodiment, the user interface 101 comprises a pick-list 201 which can contain items that exist in the database. The items can be grouped by e.g. their category (measures or dimensions). A user entering a question in the input box 102 can pick a data item from the pick-list 201 to thereby uniquely identify a data item for a question. Thereby, the user is not required to remember data items of the database. The pick-list 201 can be provided with data items by manually entering them or by automatically retrieving existing data items in the database.

It should be noted also in connection with this embodiment that the input box 102 can designate a means for receiving and recognizing a spoken question;

for instance by means of a microphone and voice recognition means.

Figure 3:
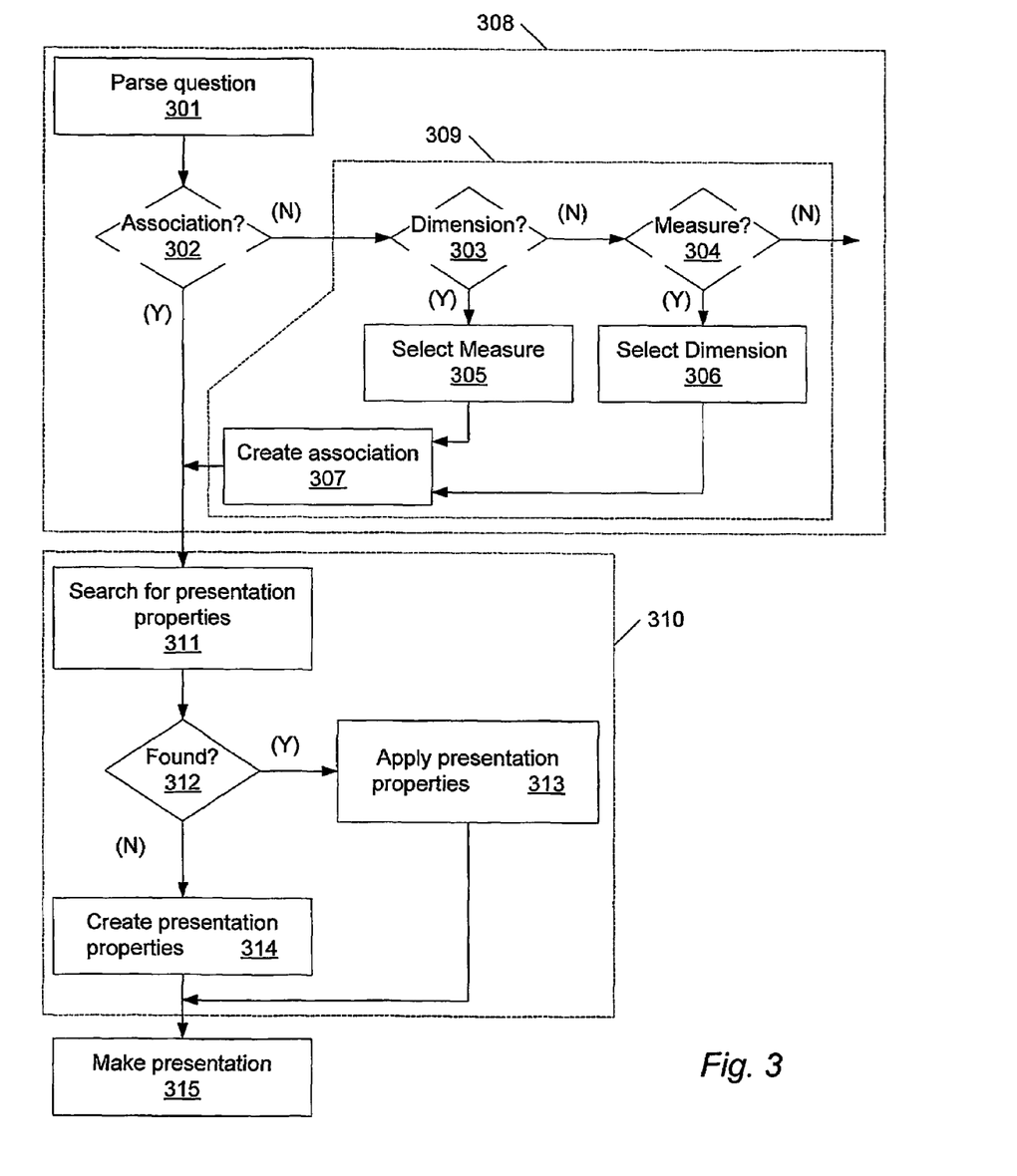
FIG. 3 shows a flowchart of a method according to the invention of determining an association and determining a presentation.

FIG. 3 shows a flowchart of a method according to the invention of determining an association and determining a presentation. The flowchart is divided into a data determining section 308, a presentation determining section 310 and a step 315 of making a presentation based on determined data and presentation properties. In the data determining section 308, a first step 301 is to parse a question received from a user. This step comprises identifying data items and their category and associations of data items, if any. Optionally, the step 301 can comprise identifying dimension levels; criteria, if any; and combinations of associations. In subsequent step 302 it is determined whether any associations were identified. In the positive event (Y) it can prima facia be deduced that sufficient data were present in the question and that a search for presentation properties can be initiated in step 311. In the negative event (N) however, it can be deduced no association is found in the question and according to the invention the method continues in section 309 of the flowchart to create an association. In section 309 it is examined in step 303 whether an identified data item is of the dimensions type. In the positive event (Y) of step 303 a data item of the measures type is selected in step 305. In the negative event (N) of step 303 it is examined in step 304 whether an identified data item is of the measures type; and in the positive event (Y) thereof a data item of the dimensions type is selected in step 306. In case no measure is identified, and consequently no dimension is identified, it can be deduced that the question has not even incomplete information, but is lacking information. In this case the situation can be handled by prompting the user to enter a valid question with at least one data item or alternatively to apply the most frequently used question and therewith applied presentation properties.

In steps 305 and step 306 a previously used association, if any, involving the identified data item may be detected. However, in the event no previously used association involving the data item is found a most frequently used data item can be selected or all data items of the respective type can be selected. An association based on the identified data items and determined data items is created in step 307. This step can involve creating a memory object for each data item of the dimensions type.

If a data item of the measures type or dimensions type has been selected in either step 305 or step 306, respectively, a search for presentation properties can in a storage memory be initiated in step 311. In step 312 it is examined whether a previously used presentation is found. In the positive event (Y) presentation properties of a previously stored, like association is found, the presentation properties are applied in step 313 to make a presentation of the data specified by the association in step 315. Alternatively (N), if no like association is found, presentation properties are created either be selecting the association that is most like an existing association and/or by use of an expert system. Consequently, even a question with incomplete data identification can lead to retrieval and application of preferred presentation properties to make a presentation.

In a preferred embodiment, the method according to the invention can simply parse the question to identify associations, and subsequently proceed directly to step 311 to search for presentation properties. Thereby, presentation properties can be retrieved based on associations identified in the question. Thus the steps 302 and steps in section 309 can be omitted while the method is in accordance with the invention.

Thus in accordance with the invention, a dimension or measure as the case may be can be selected to create a complete association. However, in accordance with another aspect of the invention an identified association, dimension or measure can be expanded to multiple associations.

The expanding can be based on user preferences. User preferences can be determined by maintaining a list of combinations of associations that are used concurrently or in the same data report. Thus, when an association is determined it can be expanded by looking up other associations which have previously been used in combination with the identified association. Alternatively, the list can include a number which for an identified association reflects the likelihood that a user will apply another identified association. This number can be a relative or absolute number of times the identified association has previously been used in combination with the other identified association. Thus, when an association is determined it can be expanded by looking up other associations which, with a given likelihood, have been used in combination with the identified association. For instance, the given likelihood can be expressed as a threshold value of e.g. 50%; for an association A1 it is stated that in 10% of its uses association A2 is also used, whereas in 90% of its uses association A3 is also used. Thus it can be deduced that A1 should be expanded to be combined with A3.

When a measure is identified, firstly, a complete association is created by selecting a dimension. Secondly, this created association can be expanded as set forth above. This also applies to dimensions.

The aspect of expanding an association from an identified association and/or measure and/or dimension can be embodied as an individual step between section 308 and 310. Alternatively, the aspect can be embodied by means of section 310. In any event, when an association is expanded presentation properties is to be applied to make a presentation of the multiple associations obtained by expanding an identified association.

It should be noted that step 302 can be applied iteratively to identify multiple associations and/or measures and/or dimensions in the metadata.

Figure 4:
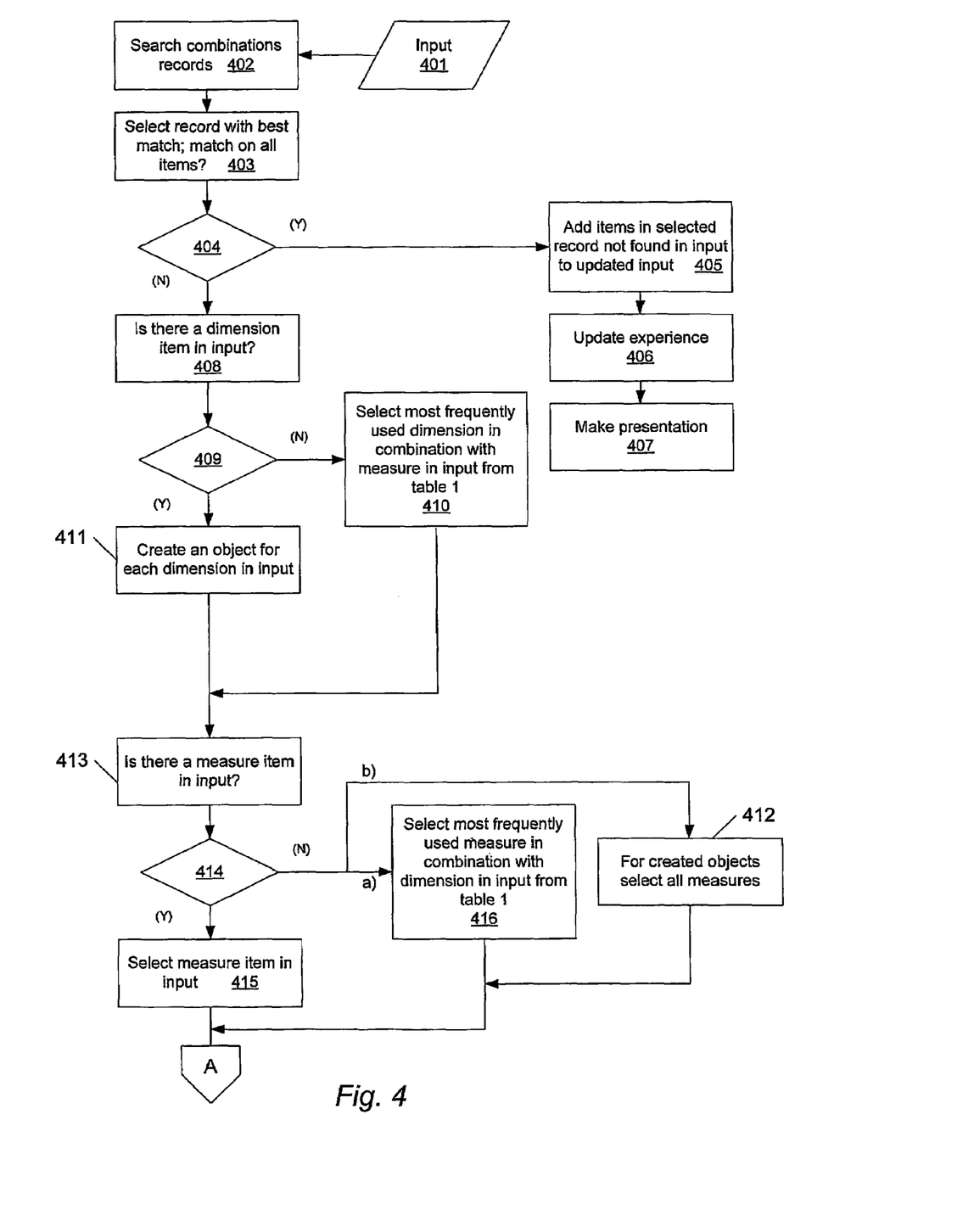
FIG. 4 shows a flowchart of a method according to the invention of determining an association.

FIG. 4 shows a flowchart of a method according to the invention of determining an association. This flowchart is an alternative and more detailed illustration of the process of determining data. Based on a question 401, a storage memory of combinations of presentation objects is searched to find presentation properties for previously used combinations of presentation objects; e.g. a combination of a pie chart and a bar chart object. The contents of the storage memory of combinations of objects can have the below exemplary form:

TABLE 2

| Combination | Frequency |
|---|---|
| Object1 = (Time Level 1; Turnover);<br>Object2 = (Country; Contribution Margin); | 3 |

TABLE 2-continued

| Combination | Frequency |
| --- | --- |
| Object3 = (Customer Level 0; Turnover; Cost; Contribution Margin); Criteria = (Time Level 1 = 2003 January) Object1 = (Time Level 0; Contribution Margin); Object2 = (Customer Level 0; Turnover; Cost; Contribution Margin); Criteria = (Country = "United States"; Time Level 0 = 2003) | 2 |
| Object1 = (Time Level 2; Turnover); | 3 |
| ... | ... |

Alternatively, this can be represented in XML format as shown below for the first record in table 2:

```
<object name="object1">
    <dimension name="Time Level 1"/>
    <measure name="Turnover"/>
</object>
<object name="Object2">
    <dimension name="Country"/>
    <measure name="Contribution Margin"/>
</object>
<object name="Object3">
    <dimension name="Customer Level 0"/>
    <measure name="Turnover"/>
    <measure name="Cost"/>
    <measure name="Contribution Margin"/>
</object>
<object name="Criteria">
    <dimension name="Time Level 1"/>
    <value name="2003 January"/>
</object>
```

As a result of the search, the record that is determined to have the best match with a record is selected temporarily and it is examined whether the temporarily selected record matches all items identified in the question. In case there is a match on all items (Y) it is determined in step 404 to continue to step 405, wherein properties of the temporarily selected record is applied to make a presentation in step 407. Before or after making the presentation in step 407, the frequency of use of the selected presentation is updated.

In case there is not a match on all items (N) it is determined in step 404 to continue to step 408, wherein it is examined whether a data item of the dimensions type was identified. Preferably, step 408 comprises selecting one, preferably a first, of several associations, if there are several associations. However, according to the invention, the method can resume to this step, in which case a next association is selected. In the positive event (Y) of step 408, an object for each identified dimension is created. This is based on the assumption that each dimension is to be presented by an individual object. In the event (N) that no dimension can be identified, the most frequently used dimension in association with an identified measure, if any, is selected. Thereby, if for instance a data item 'sale' is identified the method can select e.g. the data item 'time' if this is the most frequently used data item in association with 'sale'. Subsequently, an object for the selected data item of the dimensions type is created.

Preferably, the method continues to step 413 in which it is examined whether a data item of the measures type is identified. If, in step 414, it is decided that a measure item is identified (Y) the identified measure item is selected; alternatively (N) the most frequently used measure in association with the identified dimension is selected.

At this stage of the method, identified by the downward arrow with capital 'A', data items are selected and presentation objects have been created. If several associations are identified, the method can resume at step 408. Alternatively, the method can continue despite there are several associations to resume at step 408 from a later step.

Figure 5:
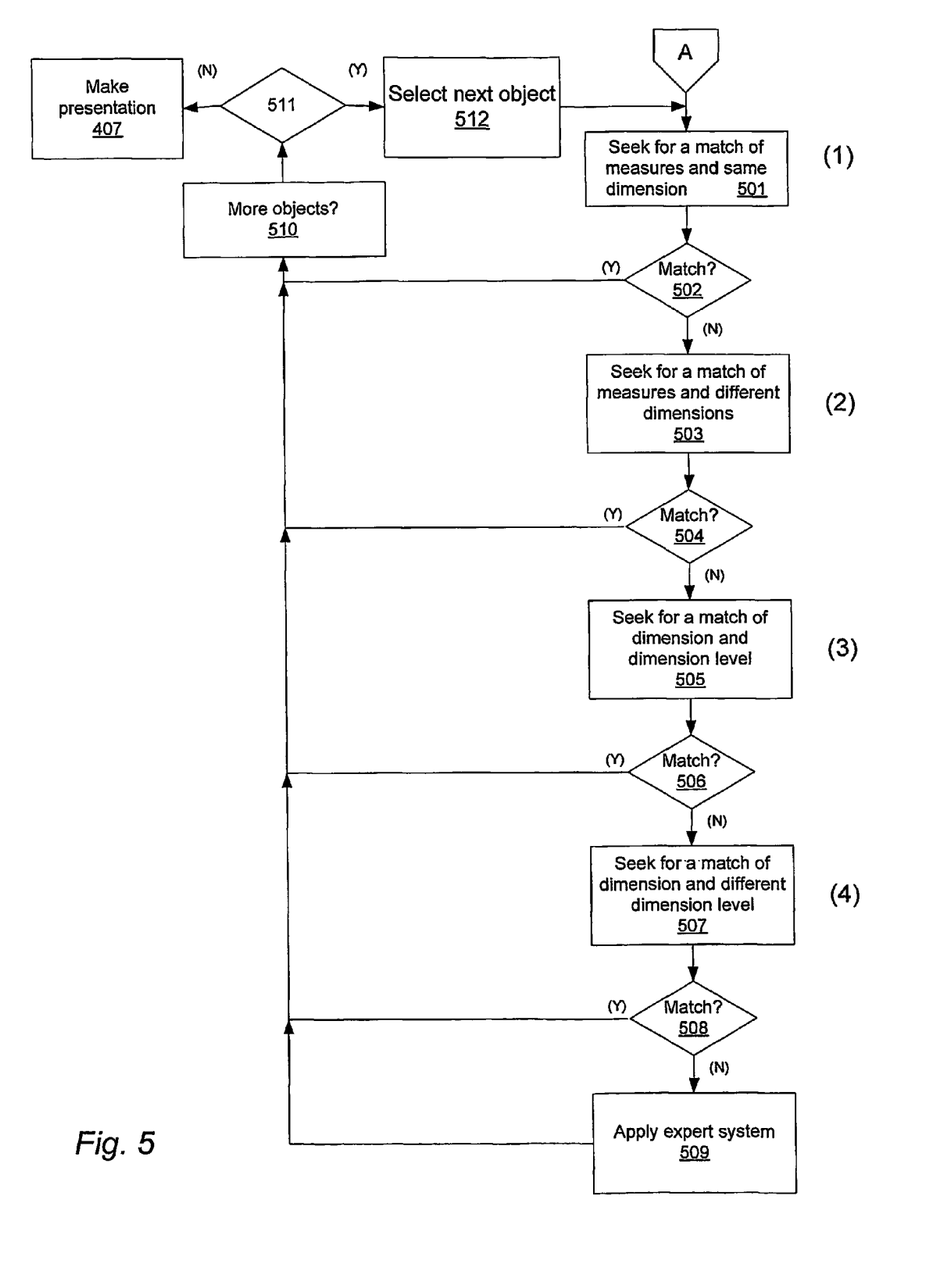
FIG. 5 shows a flowchart of a method according to the invention of determining a presentation.

FIG. 5 shows a flowchart of a method according to the invention of determining a presentation. The flowchart is entered at a stage identified by the downward arrow with capital 'A'. At this stage, data items are selected to form an association and presentation objects have been created. Thus, according to invention, presentation properties for a determined association can be determined by searching a storage for presentation properties of a previously stored, like association. In the event presentation properties of a previously stored, like association is found, the presentation properties can be applied to make a presentation of the data specified by the association.

At a first level of a layered search for presentation properties, the method comprises a step 501 of seeking a match of all data items of an association; and if a match is found (Y), step 502 directs the method to a next object. Alternatively (N), if no match is found, step 502 directs the method to a second level at which the method comprises a step 503 of seeking a match of an identified data item of the measures type only. Thereby, an associated data item of the dimensions type can be different from the identified data item of the dimensions type. If a match is found (Y), step 504 redirects the method to a next object. Alternatively (N), if no match is found, step 504 directs the method to a third level at which the method comprises a step 505 of seeking a match of data items of the dimensions type at same dimensions levels—for instance 'time, month' may match whereas 'time, day' consequently will not match. In the positive event, a match is found; step 506 directs the method to a next object. In the negative event, a match is not found; step 506 directs the method to a fourth level. At this fourth level the method comprises a step 507 of seeking a match of an identified data item of the dimensions type only. Thus, allowing the dimension level to be different. If a match is found (Y), step 508 redirects the method to a next object. Alternatively, it is deduced that no like presentation has been recorded and an expert system is applied in step 509 to select presentation properties based on e.g. constraints of the medium on which the presentation is to be produced and/or based on the structure and/or format of the data to be presented. The method is redirected to a next object from steps 502, or 504, or 506, or 508, or 509 via steps 510, 511 and 512. In case step 408 is resumed from a stage corresponding to transition 'A', step 512 of selecting a next object leads to step 501 is more objects were identified in step 510. Alternatively, if the method is not arranged to resume at step 408 from a stage corresponding to transition 'A', step 512 of selecting a next object is omitted and the flow is resumed at step 408 from step 511 in positive events (Y).

Thereby, a layered search is provided for resembling presentation properties, which to a largest possible extent conforms to a user's recorded preferences.

The expert system can be illustrated by pseudo-code of the following form, where BEGIN and END statements enclose the pseudo-code:

```
BEGIN
    If dimension is a time-dimension then
        Type=barchart, legend=off; labels=off; 3D
        effects=Orthogonal
```

-continued

```
        Else if one measure then
                Type=piechart, legend=on; labels=on; 3D-
                effects=Orthogonal
        Else
                Type=crosstab, legend=off; labels=off; 3D-
                effects=none
        Retrieve data from database
        If Type=piechart and number of dimension members is > 10 then
                Type=crosstab, legend=off; labels=off; 3D-
        effects=none
        If type not map and all dimension members are defined on map
        then
                Type=map, legend=off; labels=on; 3D-effects=none
        If labels overlapping then
                Labels=off
END
```

After the statement 'Retrieve data from database' it is possible to involve the structure and format of data to make decisions by means of the expert system.

The expert can be a type using linear logic programming, fuzzy logic or of any another type. Thus, the expert system can be implemented in various other ways than shown above.

To explain multidimensional databases, measures, dimensions, and levels one can imagine a spreadsheet whose rows represent products and columns represent months; these constitute two dimensions. In continuation thereof, it is possible to stack additional sheets (one for each sales office, say) that also have product and month rows. "Sales offices" thus becomes the third dimension.

A multidimensional database can multiple dimensions, representing, for example, different scenarios (e.g., budget versus actual) or customer categories. The data item to be measured across these dimensions is called a measure. In the above description of a preferred embodiment, e.g. 'sales' is a measure. A multidimensional database can have multiple measures. For example, it is possible to track both monetary income and units sold across the various dimensions. If a dimension consists of units that can be broken down into smaller units or grouped into larger ones, the relationship between unit levels is known as a hierarchy or simply 'levels'. Typical hierarchies are years broken down into levels of quarters and months, or sales offices grouped into regions. Many OLAP applications assign a single unit at the top hierarchical level of each dimension to represent the total for the entire dimension. Analysis tools then allow you to drill down into greater detail—for example, beginning with sales for the entire company, then by region, then by sales offices, and, finally, by individual salespersons.

Meta-data is descriptions of data items and can range from simple field names or table names to more advanced descriptions of the data comprising e.g. description of processes generating the data.

Figure 6:
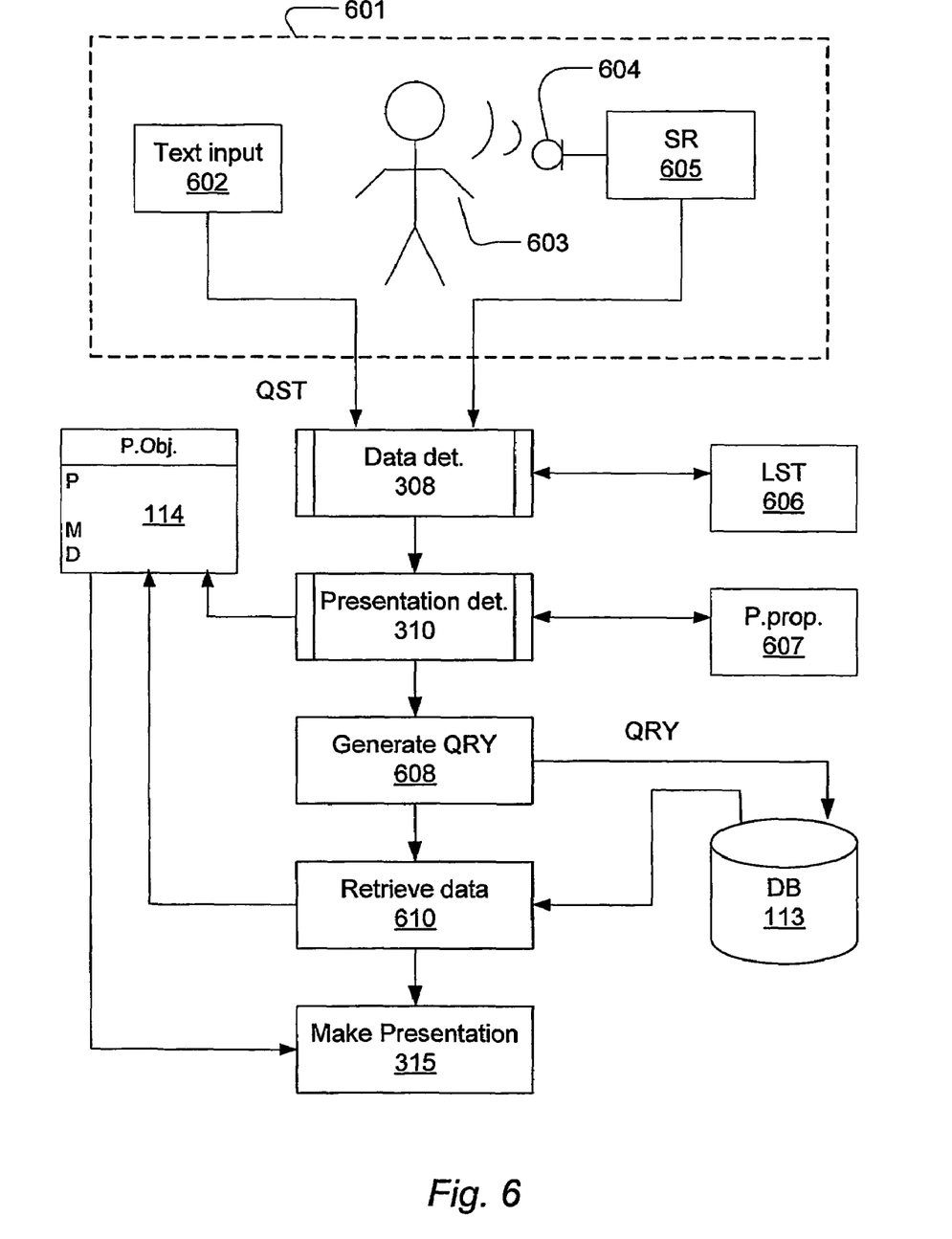
FIG. 6 shows a flowchart of making a presentation from a question.

FIG. 6 shows a flowchart of making a presentation from a question. The question, designated QST, is received in the form of a text input in step 602 or alternatively in the form of a spoken question, which is processed by a step 605 of performing speech recognition on the spoken question. The question is subsequently provided in computer-readable form. Whatever the form of the question, QST, it is submitted by a human user 603. The question can also be asked by other means e.g. recognition of a handwritten question or activation of icons. The step of receiving a question is generally designated by a step 601.

Since it is a human user who submits the question it may generally comprise items or fragments e.g. words spaced apart which may be natural language words/terms or artificial terms which are or are not recognizable as data items or a type of operator or command. In case of syntax validation while a user inputs his question e.g. in case of an icon based or pick-list based input the typical case will be that all items of a question is recognizable.

However, when the question is received, it is determined in step 308 which of items in the question that are contained in a predefined list 606 of items that are available in the database and are defined to be of the measures type or the dimensions type. This predefined list 606 of items can be an integrated portion of the database and provided via an interface to the database or it can be stored in a memory external to the database.

Based on the items determined as being recognizable an association is determined. The association comprises a data item of the measures type and a data item of the dimensions type. The association is determined either since it is readily provided in the question itself or since it is completed from a data item of the measures type or the dimensions type or since it is selected as a most frequently used association. A preferred embodiment of step 308 is described in more detail in connection with FIG. 3 especially, determining an association is described in connection with section 309.

When an association is determined, presentation properties of the association can be determined in step 310, confer FIG. 3. The presentation properties are determined based on the determined association and previously stored associations, which previously stored associations, are each related to presentation properties. Associations and the presentation properties they are related to are stored in a table 607. Presentation properties can be retrieved as described in connection with FIG. 5. Generally, the association, among the stored associations, which is most similar to the determined association, is identified and its related presentation properties are applied to the determined association as the best educated guess.

Since it is desired to improve the ability to interpret even unskilled user's requests for presentations, less formal questions are accepted. Recordings of previously applied questions and presentations can serve as a basis for remedying almost any lacking or incorrect information in a question. Applying associations to provide this remedy makes it possible to make a query to the database based on a determined association and consequently to retrieve data that are presented by means of the presentation properties.

A query, QRY, is submitted to a database 609 in step 608. The query is composed to comply with the database. A person skilled in the art will know how to generate such queries automatically from the information on measures, dimensions and dimension values as available e.g. in the storage of previously used queries and/or associations and presentation properties.

In step 610, data from the database is received in response to the query, QRY. Finally, the presentation properties are applied to make a presentation of data in step 315 as specified by the association. Preferably, a memory object 114 is created for each determined data item of the dimensions type. The memory object 114 may thus comprise both presentation properties and the data to be presented. Additionally, the memory object can comprise the association from the which the query retrieving the data is generated and it con optionally comprise the query itself.

Figure 7:
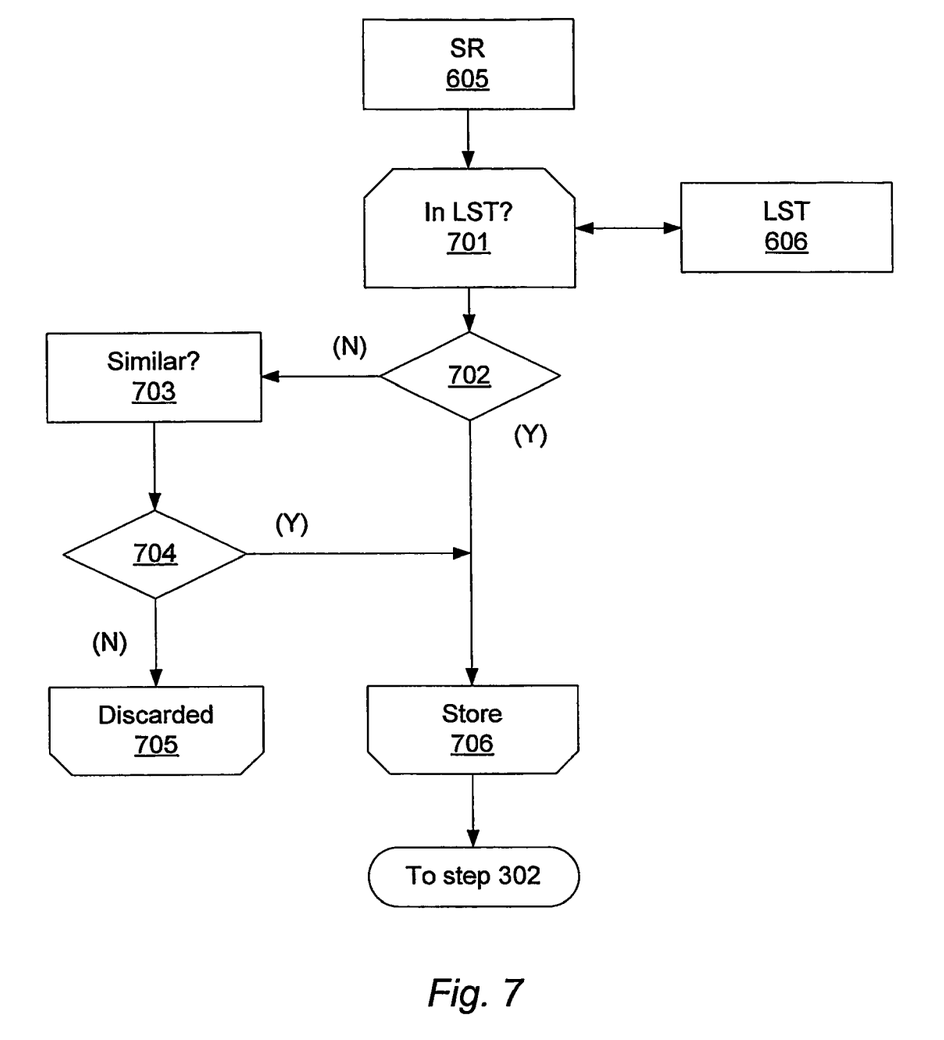
FIG. 7 shows a flowchart of improving speech recognition.

FIG. 7 shows a flowchart of improving speech recognition. The flowchart comprises step 605 in which speech recognition is performed on a spoken question. The output generated by step 605 is a computer-readable sequence from which fractions of the question can be read. A fraction can be e.g. a natural language word or an interpretation of an utterance separated by a pause or time interval. Subsequently, a loop is entered which for each e.g. natural language word examines whether the word is in the list 606 of predefined items that are available in the database. In the straight forward case, the word is in the list, the word is determined as being recognised and the via step 702 (Y) the step 706 is entered and the recognised word is stored. Alternatively, if the word is not in the list 606 step 703 is entered via step 702 (N) and it is examined whether the word is similar to a word in the list. Similarity is defined in either or both of the meanings that:

The word is similar to a word in the list in that it deviates in a way where it is decided that the word likely should have been a word from the list. Different rules known in the art may be applied for deciding on this.

The word is a synonym to a word in the list. Different groups of synonyms can be defined e.g. saying that the word 'customer' is not the only word that trigger the data item named 'customer' in the predefined list 606, but the word 'client' can also trigger the data item named 'customer'.

If the word is determined not to be similar in one or both of the ways above or another way it is discarded in step 705 which is entered via step 704 (N).

However, if the word is determined to be similar it is stored as a recognized word in step 706 which is entered via step 704 (Y).

When the question has been examined in accordance with the above, the method proceeds to step 302 as described in connection with FIG. 3.

It should be noted that the above can be combined with different syntactical examinations of the question. However, in a preferred embodiment, no advanced syntactical examination is applied, but an association is created directly from recognized items. Thereby, on the one hand, the order in which the items appear in the question is diminished, while on the other hand the skills required to ask valid questions is reduced to a very basic level. Thereby more users can exploit the use of questioning databases to make presentations.

The invention claimed is:

1. A computer-implemented method of making a presentation of data retrieved by submitting a query to a database including data categorized as a measures-type, which includes data representing amounts, and data categorized as a dimensions-type, which includes data along which measures-type data can be arrayed, said method comprising:
   receiving, from a computer-user interface device, a question including a plurality of data items;
   comparing the plurality of data items in the question to a set of reference data items in the database, said reference data items belonging to either of the measures-type category or the dimensions-type category;
     identifying, based on said comparing, a first of the plurality of data items in the question that is included in the set of reference data items and belongs to the measures-type category;
   identifying, based on said comparing, a second of the plurality of data items in the question that is included in the set of reference data items and belongs to the dimensions-type category;
   determining whether a first, predefined association exists between the first data item and the second data item;
   in the event that a first, predefined association exists between the first data item and the second data item:
     determining a similarity between the first association and one or more second associations stored in the database, said second associations having corresponding presentation properties;
     retrieving presentation properties corresponding to one of said second associations based on the determined similarity of the second association and the first association;
     generating a database query based on the first association;
     retrieving data from the database, said retrieved data corresponding to a result obtained by querying the database using said generated query; and
     presenting the retrieved data on a display device according to the retrieved presentation properties;
     registering in the database the first association and the second association with a count that represents a frequency of use; and
   in the event that no first, predefined association exists between the first data item and the second data item:
     identifying one of the plurality of data items in the question that belongs to either the dimensions-type or the measures-type,
     selecting a data item belonging to either the measures-type or the dimensions-type, respectively, from a data storage device, wherein said selecting is based on the most frequently used data item of the dimensions-type or the measures-type, respectively, and
     creating a third association between the selected data item and the determined one of the plurality of data items.

2. The method according to claim 1, wherein determining items in the question includes: parsing the question to identify fractions of the question; comparing identified fractions to items comprised in the predefined list of items; and selecting an item being determined as matching the fraction as a determined item.

3. The method according to claim 1, wherein the method includes: receiving a spoken question, which is processed by a step of performing speech recognition to provide items in the question in computer-readable form.

4. The method according to claim 3, wherein identifying data items in the question includes:
   determining whether a word in the question is similar to an item in the predefined list of items;
   if the word is determined not to be similar, discarding the word; and
   if the word is determined to be similar, storing the word as a identified data item.

5. The method according to claim 1, wherein the step of determining a similarity comprises:
   searching a first storage device to detect a previously used association, if any, involving the determined data items, and
   in the event no previously used association involving the identified data items are found, creating an association including the identified data items.

6. The method according to claim 1, comprising:
   examining the question to detect combinations of associations;
     determining presentation properties by searching stored combinations of associations with assigned presentation properties; and
   applying the presentation properties to make a presentation of data specified by the combinations of associations.

7. The method according to claim 6, wherein the step of selecting a data item of the measures type or dimensions type includes:
   selecting from a storage device the data items that can be associated with the identified data item in the question to create an association.

8. The method according to claim 1, wherein the step of identifying a data item of the measures type involves selecting from a storage device the data items that are determined to be the most frequently used data items in association with the determined data item in the question.

9. the method according to claim 1, wherein the method comprises: creating a memory object for each determined data item of the dimensions type.

10. The method according to claim 1, wherein the step of retrieving the presentation properties of the second association comprises: applying the presentation properties to make a presentation of the data specified by the second association.

11. The method according to claim 1, wherein the determination
of presentation properties comprises a layered search for presentation properties.

12. The method according to claim 11, wherein the layered search comprises a first level with a search for a match of measures and same dimensions.

13. The method according to claim 11, wherein the layered search comprises a second level with a search for a match of measures and different dimensions.

14. The method according to claim 11, wherein the layered search comprises a third level with a search for a match of dimension at primarily same level of dimension or secondarily at a different level of dimension.

15. The method according to claim 1, comprising the step of applying an expert system, arranged to determine and apply presentation properties, in the event no like association is found.

16. A computer-readable medium encoded with a program implementing the method set forth in claim 1 when run on a computer.

17. A computer program product implementing the method set forth in claim 1 when run on a computer.

18. A computer-readable medium storing program instructions that, when executed by a computer, controls the computer provide a user-interface arranged to make a presentation of data according to method set forth in claim 1.

19. A system comprising:
a processor;
a computer-user interface device;
a display device;
a database including data categorized as a measures-type, which includes data representing amounts, and data categorized as a dimensions-type, which includes data along which measures-type data can be arrayed; and
a computer-readable data recording device having program instructions that, when executed by the processor, cause the system to perform a method of making a presentation of data retrieved by submitting a query to the database, said method comprising:

receiving, from the computer-user interface device, a question including a plurality of data items;
comparing the plurality of data items in the question to a set of reference data items in the database, said reference data items belonging to either of the measures-type category or the dimensions-type category;
identifying, based on said comparing, a first of the plurality of data items in the question that is included in the set of reference data items and belongs to the measures-type category;
identifying, based on said comparing, a second of the plurality of data items in the question that is included in the set of reference data items and belongs to the dimensions-type category;
determining whether a first, predefined association exists between the first data item and the second data item;
in the event that a first, predefined association exists between the first data item and the second data item:
determining a similarity between the first association and one or more second associations stored in the database, said second associations having corresponding presentation properties;
retrieving presentation properties corresponding to one of said second associations based on the determined similarity of the second association and the first association;
generating a database query based on the first association;
retrieving data from the database, said retrieved data corresponding to a result obtained by querying the database using said generated query;
presenting the retrieved data on the display device according to the retrieved presentation properties, and
registering in the database the first association and the second association with a count that represents a frequency of use; and
in the event that no first predefined association exists between the first data item and the second data item:
identifying one of the plurality of data items in the question that belongs to either the dimensions-type or the measures-type,
selecting a data item belonging to either the measures-type or the dimensions-type, respectively, from a data storage device, wherein the selecting is based on being the most frequently used data item of the dimensions-type or the measures-type, respectively, and
creating a third association between the selected data item and the determined one of the plurality of data items.

* * * * *